(12) United States Patent
Turner et al.

(10) Patent No.: US 12,596,886 B2
(45) Date of Patent: Apr. 7, 2026

(54) PERSONALIZED RESPONSES TO CHATBOT PROMPT BASED ON EMBEDDING SPACES BETWEEN USER AND SOCIETY

(71) Applicant: Capital One Services, LLC, McLean, VA (US)

(72) Inventors: Taylor Turner, Richmond, VA (US); Galen Rafferty, Mahomet, IL (US); Samuel Sharpe, Cambridge, MA (US); Brian Barr, Schenectady, NY (US); Jeremy Goodsitt, Champaign, IL (US); Owen Reinert, Queens, NY (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 188 days.

(21) Appl. No.: 18/418,871

(22) Filed: Jan. 22, 2024

(65) Prior Publication Data

US 2025/0238630 A1     Jul. 24, 2025

(51) Int. Cl.
 *G06F 40/40* (2020.01)

(52) U.S. Cl.
 CPC ................................... *G06F 40/40* (2020.01)

(58) Field of Classification Search
 CPC ........... G06F 40/40; G06F 40/30; G06F 40/35
 See application file for complete search history.

(56) References Cited

U.S. PATENT DOCUMENTS

| | | | |
|---|---|---|---|
| 10,565,244 B2 | 2/2020 | Kershaw et al. | |
| 10,692,006 B1 | 6/2020 | Zhang | |
| 11,238,362 B2 | 2/2022 | Jin et al. | |
| 11,551,096 B1 * | 1/2023 | Mishra ................... | G06N 3/092 |
| 11,586,810 B2 | 2/2023 | Wu et al. | |
| 2013/0096985 A1 * | 4/2013 | Robinson ........... | G06Q 30/0203 |
| | | | 705/7.32 |
| 2014/0067473 A1 * | 3/2014 | Nienstedt, Sr. ........ | G06Q 90/00 |
| | | | 705/7.32 |

OTHER PUBLICATIONS

Ré, Christopher, Feng Niu, Pallavi Gudipati, and Charles Srisuwananukorn. "Overton: A data system for monitoring and improving machine-learned products." arXiv preprint arXiv:1909. 05372 (2019). (Year: 2019).*

* cited by examiner

*Primary Examiner* — Daniel C Washburn
*Assistant Examiner* — Paul J. Mueller
(74) *Attorney, Agent, or Firm* — Banner & Witcoff, Ltd.

(57) ABSTRACT

Systems described herein may provide responses to chatbot prompts that correspond to both a user's preferences and accepted views of society. A chat recommendation server may receive a prompt from a user device. The chat recommendation server may determine a general Overton window and a user-specific Overton window associated with the prompt. The chat recommendation server may generate a plurality of candidate response using the first machine learning model, input the prompt and the plurality of candidate responses to a second machine learning model, and receive, as output from the second machine learning model, a polarization score for each of the plurality of candidate responses. Based on the polarization scores, a recommended response may be selected which minimizes a distance between the user-specific Overton window and the general Overton window. Accordingly, the recommended response may be displayed on the user device.

20 Claims, 7 Drawing Sheets

300

340

350

Chat Recommendation
Server

Network

310

User Device

320

Chat Repository System

330

Training
Database

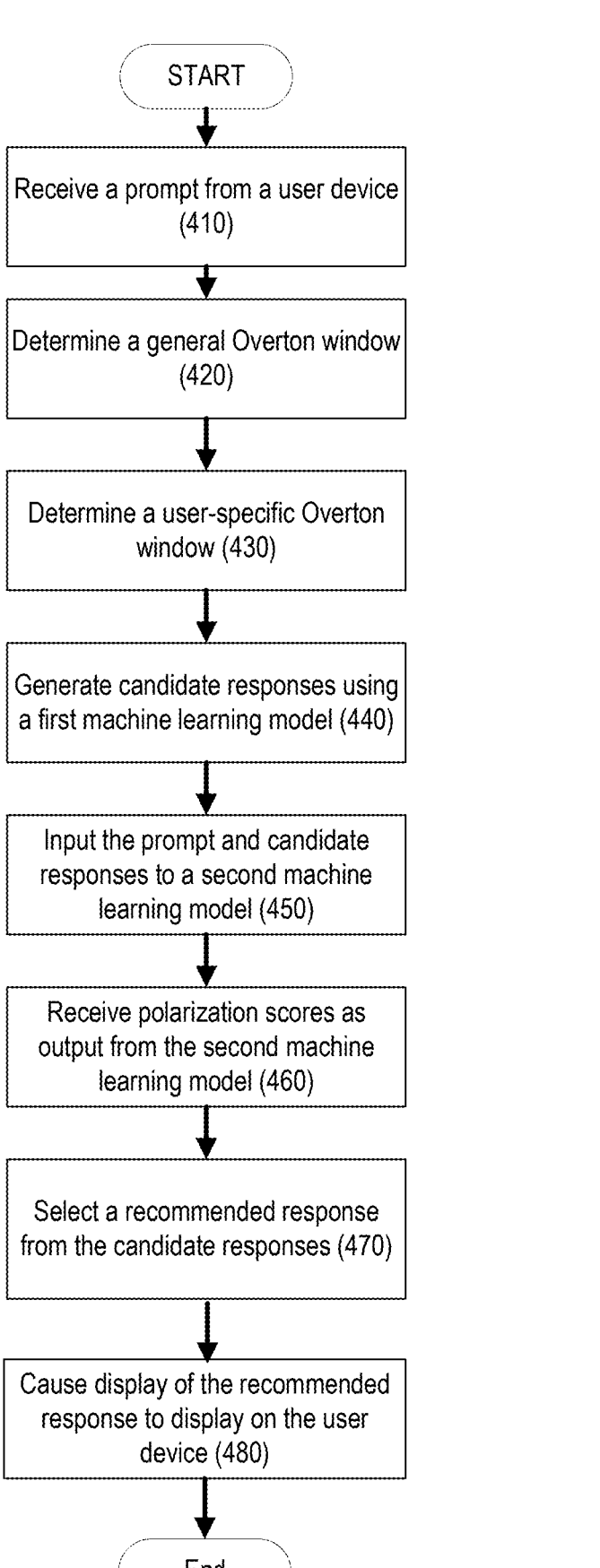

400

START

Receive a prompt from a user device (410)

Determine a general Overton window (420)

Determine a user-specific Overton window (430)

Generate candidate responses using a first machine learning model (440)

Input the prompt and candidate responses to a second machine learning model (450)

Receive polarization scores as output from the second machine learning model (460)

Select a recommended response from the candidate responses (470)

Cause display of the recommended response to display on the user device (480)

End

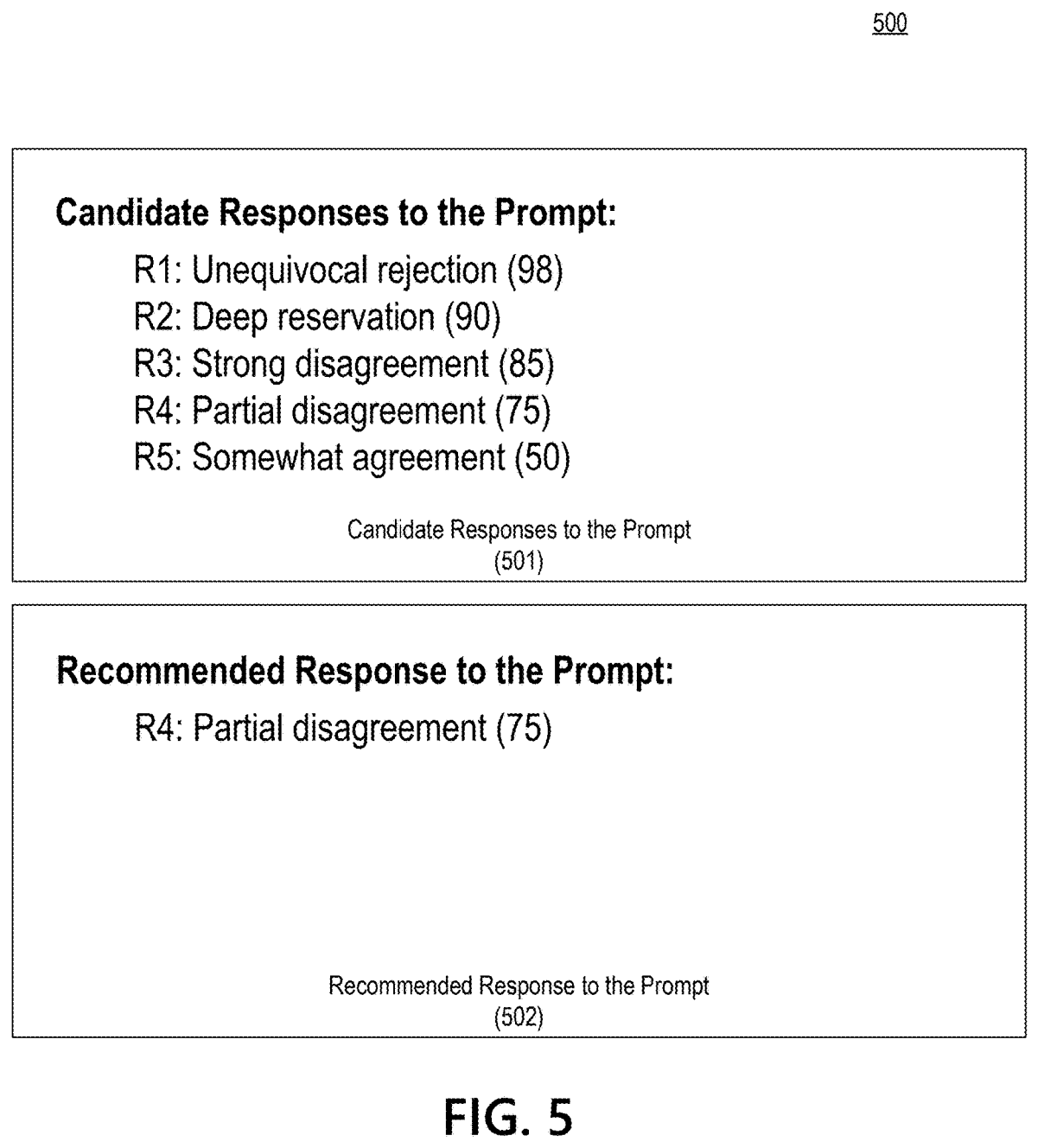

Candidate Responses to the Prompt:

R1: Unequivocal rejection (98)
    R2: Deep reservation (90)
    R3: Strong disagreement (85)
    R4: Partial disagreement (75)
    R5: Somewhat agreement (50)

Candidate Responses to the Prompt
(501)

Recommended Response to the Prompt:

R4: Partial disagreement (75)

Recommended Response to the Prompt
(502)

FIG. 5

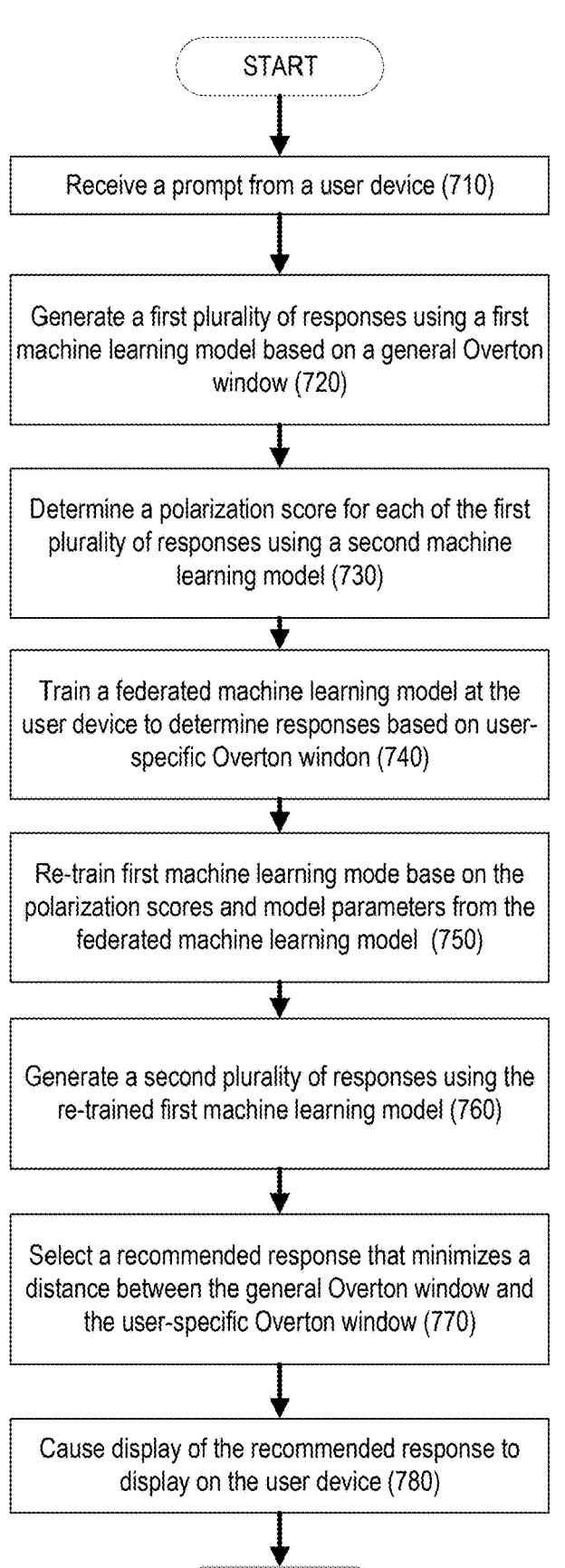

700

START

Receive a prompt from a user device (710)

Generate a first plurality of responses using a first machine learning model based on a general Overton window (720)

Determine a polarization score for each of the first plurality of responses using a second machine learning model (730)

Train a federated machine learning model at the user device to determine responses based on user-specific Overton windon (740)

Re-train first machine learning mode base on the polarization scores and model parameters from the federated machine learning model (750)

Generate a second plurality of responses using the re-trained first machine learning model (760)

Select a recommended response that minimizes a distance between the general Overton window and the user-specific Overton window (770)

Cause display of the recommended response to display on the user device (780)

End

FIG. 7

PERSONALIZED RESPONSES TO CHATBOT PROMPT BASED ON EMBEDDING SPACES BETWEEN USER AND SOCIETY

FIELD OF USE

Aspects of the disclosure relate generally to big data and more specifically to the processing and generating of automated responses to user prompts.

BACKGROUND

A user may frequently interact with a chatbot (e.g., Open AI's ChatGPT, Microsoft's Bing Chat and Google's Bard) or a social media platform (e.g., YouTube) by providing a prompt (e.g., a chatbot prompt) and receiving a response via text to text or voice to text interactions. The platforms may increasingly recommend more and more polarizing content to cater to the user's interests. If the platforms attempt to remove polarizing content and replace it with a vanilla version that is acceptable from a societal perspective, they risk losing credibility with the user. As a result, a conventional system might lack a mechanism to strike a balance between the conflicting goals of rendering content tailored to the user's preference, while considering the perspectives of society, thereby limiting the conventional system's ability to recommend relevant and modulated responses in the chatbot platforms.

Aspects described herein may address these and other problems, and generally improve the accuracy, efficiency, and speed of automatically processing chat data and providing responses to user prompts with insights from both the user's and society's perspectives.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for providing personalized responses to chatbot prompts based on user-specific and society-specific Overton windows. A chat recommendation server may receive a prompt from a user device associated with a user. In some examples, the chat recommendation server may use a first machine learning model to determine a general Overton window and a user specific Overton window associated with the prompt. The general Overton window may correspond to a first cluster of responses in a first embedding space of the first machine learning model, and the first cluster of responses may indicate acceptable views of society. The user-specific Overton window may correspond to a second cluster of responses in a second embedding space of the first machine learning model, and the second cluster of responses may indicate preferences of the user. Further, the chat recommendation server may generate, using the first machine learning model and based on the user-specific Overton window, a plurality of candidate responses. The chat recommendation server may input the prompt and the plurality of candidate responses to a second machine learning model. The chat recommendation server may receive, as output from the second machine learning model, a polarization score for each of the plurality of candidate responses. The chat recommendation server may select, from the plurality of candidate responses and based on the polarization score, a recommended response that minimizes a distance between the user-specific Overton window and the general Overton window. Accordingly, the chat recommendation server may cause the recommended response to be displayed on the user device in response to the prompt.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 4 shows a flow chart of a process for providing personalized responses to chatbot prompt based on user and society Overton windows according to one or more aspects of the disclosure;

FIG. 5 shows candidate responses and a recommended response according to one or more aspects of the disclosure;

FIG. 7 shows a flow chart of a process for providing personalized responses to chatbot prompt using a federated machine learning model according to one or more aspects of the disclosure;

DETAILED DESCRIPTION

Figure 1:
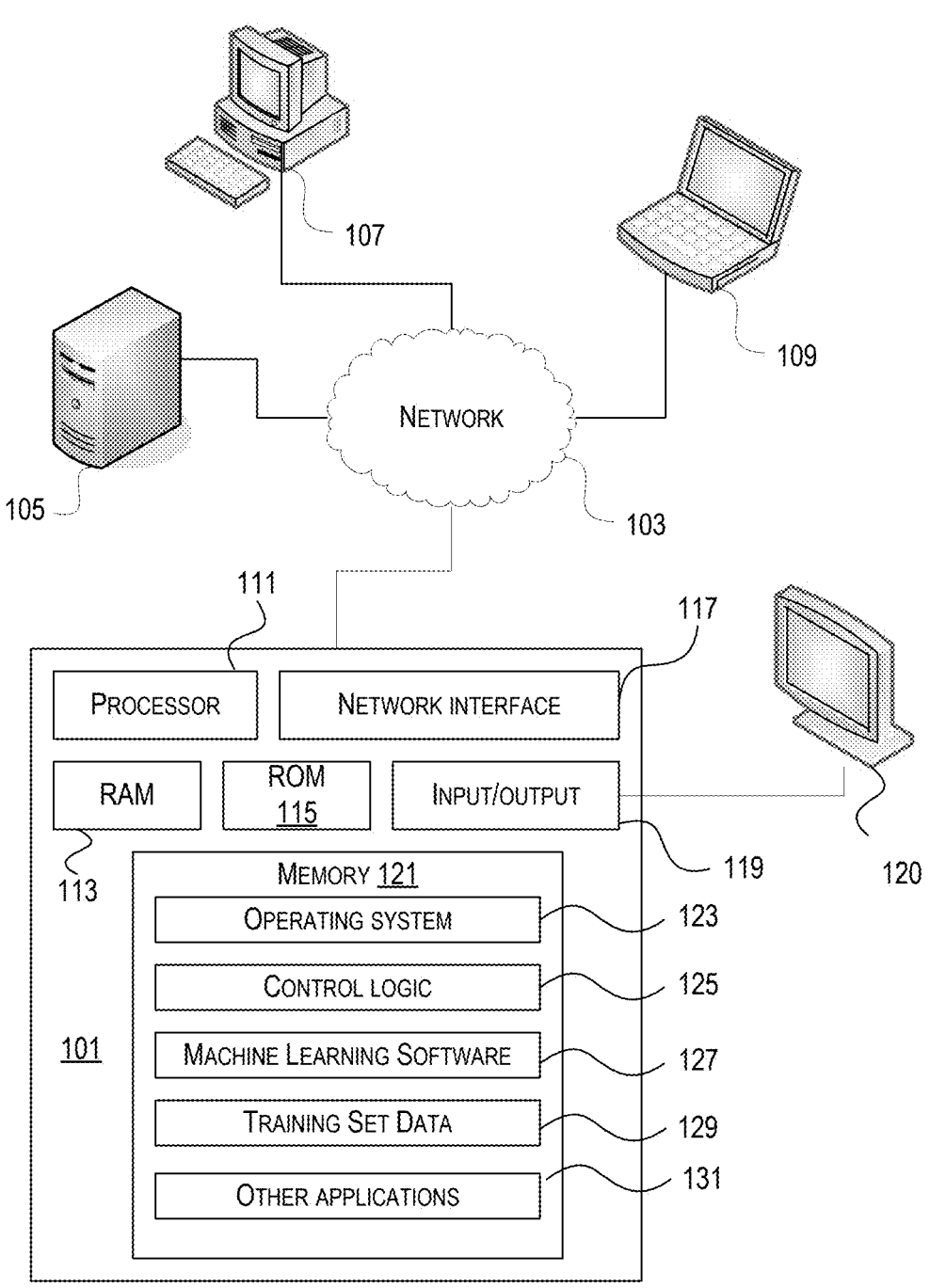
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects described herein may relate to providing personalized responses to chatbot prompts based on user Overton window (e.g., user-specific Overton window) and society Overton window (e.g., general Overton window). A chat recommendation server may receive a prompt from a user device associated with a user. The chat recommendation server may use a first machine learning model to determine a general Overton window associated with the prompt and a user specific Overton window associated with the prompt. The general Overton window may correspond to a first cluster of responses in a first embedding space of the first machine learning model, and the first cluster of responses may indicate acceptable views of society. The user-specific Overton window may correspond to a second cluster of responses in a second embedding space of the first machine learning model, and the second cluster of responses may indicate preferences of the user. In some examples, rather than using the first machine learning model, chat recommendation server may determine the general and user-specific Overton windows using statistical analysis. The chat recommendation server may generate, using the first machine learning model and based on the user-specific Overton window, a plurality of candidate responses. The candidate responses may fall within the user-specific Overton window. The chat recommendation server may input the prompt and the plurality of candidate responses to a second machine learning model. The chat recommendation server may receive, as output from the second machine learning model, a polarization score for each of the plurality of candidate responses. The chat recommendation server may select, from the plurality of candidate responses and based on the polarization score, a recommended response that minimizes a distance between the user-specific Overton window and the general Overton window.

In many aspects, the chat recommendation server may determine that the general Overton window and the user-specific Overton window overlap with each other. The chat recommendation server may select, from the plurality of candidate responses that are located within an overlapping portion of the general Overton window and the user-specific Overton window, the recommended response. In another example, the chat recommendation server may determine that the general Overton window and the user-specific Overton window do not overlap with each other. The chat recommendation server may select the recommended response from the plurality of candidate responses falling within the user-specific Overton window that minimizes the distance between the user-specific Overton window and the general Overton window. For example, the recommended response may be processed using an embedding space reflective of preferences of the user, and an embedding space reflective of acceptable views of society. The chat recommendation server may select a recommended response that minimizes the distance between these two embedding spaces. Accordingly, the chat recommendation server may cause display of the recommended response to the prompt on the user device.

In many aspects, the first machine learning model may include at least one of a foundation model or a large language model (LLM). The second machine learning model may include a transformer model. The second machine learning model may also include an LLM and a foundation model. In some examples, the first and second machine learning models may be consolidated into one machine learning model. The chat recommendation server may train the first machine learning model to determine general Overton windows. The first machine learning model may be trained based on historical chat information that represents one or more acceptable views of society, which may include a plurality of prompt-response pairs from a plurality of users. The chat recommendation server may also train the first machine learning model to determine user-specific Overton windows. The first machine learning model may be trained based on a chat history of the user, which may include a plurality of prompt-response pairs from the user. Additionally or alternatively, the first machine learning model may be trained on a browsing history of the user, including articles that the user has read, social media posts made by the user, etc.

The chat recommendation system may differ from conventional chatbot systems at least because it may use the general and user-specific Overton windows for determining one or more responses to the received prompt. The present system is significantly more than merely providing responses to a prompt; rather, the present system may consider the user's perspective, as well as a societal perspective, to gauge the user's preferences and the public acceptability when generating candidate responses to a prompt. The present system may also determine polarization scores for each of the candidate responses in order to select an appropriate response tailored to the user's preferences. The present system may also implement a distance function that minimizes a distance between the user-specific Overton window and the general Overton window. The present system may use one or more machine learning models to identify candidate responses and recommend solutions.

Aspects described herein improve the functioning of computers by improving the accuracy, efficiency, and speed of computer-implemented chat data collection and processing processes. The steps described herein recite improvements to computer-implemented response generation processes, and in particular improve the accuracy and utility of chat data that may be collected to reflect a societal point-of-view and a user's perspective. This is a problem specific to computer-implemented processes, and the processes described herein could not be performed in the human mind (and/or, e.g., with pen and paper). For example, as will be described in further detail below, the processes described herein rely on interaction between the user device and a chatbot platform, the collecting and processing of dynamically generated chat data, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

Figure 2:
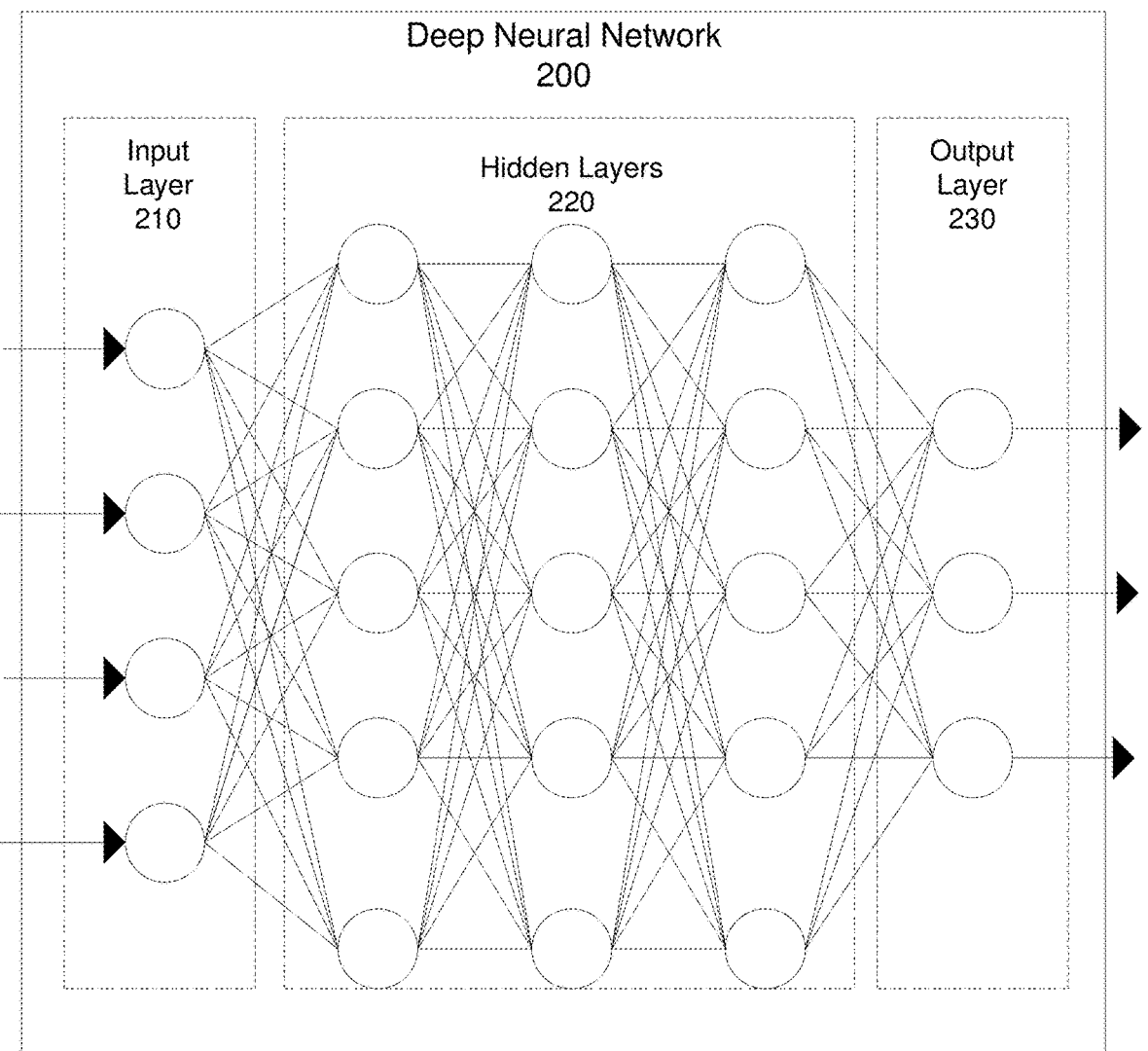
FIG. 2 depicts an example of deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network.

The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
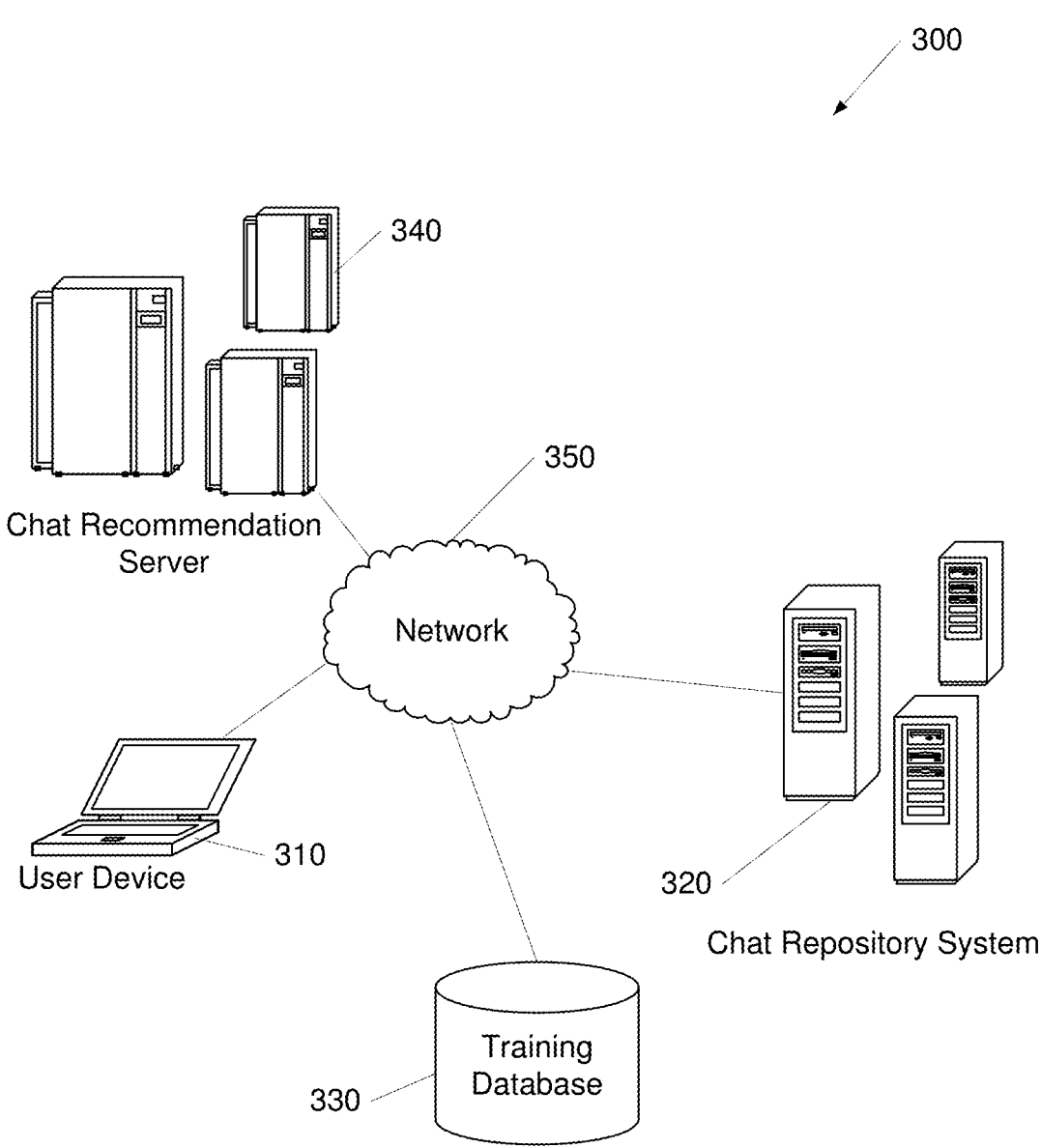
FIG. 3 shows an example of a system for providing personalized responses to chatbot prompt based on user and society Overton windows in which one or more aspects described herein may be implemented.

FIG. 3 depicts a system 300 for chat response recommendation. The chat recommendation system 300 may include at least one user device 310, at least one chat repository system 320, at least one training database 330, and/or at least one chat recommendation server 340 in communication via a network 350. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

User device 310 may execute a chat application and use the chat application to interact with chat repository system 320 and/or chat recommendation server 340. User device 310 may send a prompt to chat recommendation server 340. A user may provide the prompt via a user interface of the chat application executed on user device 310. User device 310 may receive automatically generated responses from chat recommendation server 340, mimicking human conversations through text or voice interactions. User device 310 may receive responses to the prompt that were selected because the responses fell within a user-specific Overton window reflecting the user's preferences. User device 310 may receive responses that were selected because the responses fell in a general Overton window reflecting society's acceptable views. User device 310 may receive recommended responses to the prompt that reflect both the user's preferences and society's acceptable views.

User device 310 may use the chat application to collect chat information, such as the user's conversation history of prompts and responses exchanged between user device 310, chat repository system 320 and chat recommendation server 340. User device 310 may also use other mechanisms (e.g., Application Programming Interfaces (APIs), cookies, front end or server end code, integrations with Content Management System (CMS), applications on ecommerce platforms, etc.) to collect the chat information. The chat information may include, for example, a first prompt the user inputted into the user interface of the chat application, first candidate responses, polarization scores associated with the first candidate responses, a first recommended response received from chat repository system 320 and/or chat recommendation server 340, whether the user accepted or rejected the first recommended response, and the like. The chat information may also include the subsequent prompt, candidate responses, polarization scores, recommended responses, the user feedback, and the like. User device 310 may collect and send the chat information, including the user conversation history, to training database 330 to be stored and used as training data to train or re-train one or more machine learning models.

Chat repository system 320 may collect, parse, and/or store chat information including user prompts and responses. The chat information may include text, pictures, graphics, audio and video files, etc. Chat repository system 320 and chat recommendation server 340 may form a chatbot platform (e.g., a chatbot) that executes an application or web interface on user device 310 to mimic human conversation through text or voice interactions. The chatbot platform may use machine learning models to maintain a conversation in natural language and simulate behavior of a human conversational partner. The chatbot platform may include OpenAI's ChatGPT (e.g., using GPT-3 or GPT-4), Microsoft's Bing Chat (e.g., using GPT-4), Google's Bard, and equivalent generative AI models. The chatbot platform may be built based upon foundational large language models that may be fine-tuned to target specific tasks, applications, or subject-matter domains. For example, the chatbot may be used in customer service as a virtual assistant. The chatbot may also be used as a social messaging platform to share various on topics, such as news, sports, entertainment, etc.

Training database 330 may receive, store and provide training data to train different machine learning models. Training database 330 may store training data to train a machine learning model to determine general or user-specific Overton windows. The training data may include historical chat information representing acceptable views of society and a plurality of prompt-response pairs from a plurality of users. The chat history of the user may include a plurality of prompt-response pairs from a specific user. Training database 330 may store training data to train a machine learning model to generate candidate responses that are tailored to the user. The training data may include chat history and a plurality of prompt-response pairs from the user. Training database 330 may also store training data to train a machine learning model to determine polarization scores corresponding to the candidate responses. The training data may include chat history and prompt-response pairs from the user and the public, and the corresponding pre-labeled polarization scores. Additionally or alternatively, the training data may comprise a browsing history of the user, including articles that the user has read, social media posts made by the user, etc.

Chat recommendation server 340 may invoke a chat application to be executed on user device 310. After the chat application has been initiated, chat recommendation server 340 may receive a prompt from user device 310. Chat recommendation server 340 may determine a general Overton window associated with the prompt. In one example, chat recommendation server 340 may use a first machine learning model to determine the general Overton window. The general Overton window may correspond to a first cluster of responses in a first embedding space of a first machine learning model, and the first cluster of responses may indicate acceptable views of society. In another example, chat recommendation server 340 may determine the general Overton window without the first machine learning model. For example, chat recommendation server

340 may identify a center in the first cluster of responses to the prompt and determine the general Overton window based on certain amount of standard deviations from the center. Chat recommendation server 340 may determine a user-specific Overton window associated with the prompt. In one example, chat recommendation server 340 may use the first machine learning model to determine the user-specific Overton window. The user-specific Overton window may correspond to a second cluster of responses in a second embedding space of the first machine learning model, and the second cluster of responses may indicate preferences of the user. In another example, chat recommendation server 340 may determine the user-specific Overton window without the first machine learning model. For example, chat recommendation server 340 may identify a center in the second cluster of responses to the prompt and determine the user-specific Overton window based on certain amount of standard deviations from the center.

Chat recommendation server 340 may generate a plurality of responses to the prompt, using the first machine learning model and based on the user-specific Overton window. Chat recommendation server 340 may input the prompt and the candidate responses to a second machine learning model. Chat recommendation server 340 may receive a polarization score for each of the candidate responses as output from the second machine learning model. Chat recommendation server 340 may select from the candidate responses, a recommended response that minimizes a distance between the user-specific Overton window and the general Overton window. For example, chat recommendation server 340 may determine that the general Overton window and the user-specific Overton window overlap with each other. Chat recommendation server 340 may select the recommended response from candidate responses that are located within an overlapping portion of the general Overton window and the user-specific Overton window. Additionally and/or alternatively, chat recommendation server 340 may determine that the general Overton window and the user-specific Overton window do not overlap with each other. Chat recommendation server 340 may select the recommended response from candidate responses falling within the user-specific Overton window that minimizes the distance between the user-specific Overton window and the general Overton window based on a distance function. Chat recommendation server 340 may cause the recommended response to be displayed by user device 310.

User device 310, chat repository system 320, training database 330, and/or chat recommendation server 340, may be associated with a particular authentication session. Chat recommendation server 340 may receive prompts, process chat information, and/or share candidate responses, polarization scores and recommended responses with user device 310, chat repository system 320, and/or training database 330, as described herein. However, it should be noted that any device in the chat recommendation system 300 may perform any of the processes and/or store any data as described herein. Some or all of the data described herein may be stored using one or more databases. Databases may include, but are not limited to, relational databases, hierarchical databases, distributed databases, in-memory databases, flat file databases, XML databases, NoSQL databases, graph databases, and/or a combination thereof. The network 360 may include a local area network (LAN), a wide area network (WAN), a wireless telecommunications network, and/or any other communication network or combination thereof.

The data transferred to and from various computing devices in chat recommendation system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the chat recommendation system 300. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the chat recommendation system 300 in front of one or more computing devices such that any external devices may communicate directly with the specialized hardware.

The chat recommendation system may collect and process chat information to determine general and user-specific Overton windows for a prompt. The chat recommendation system may adjust the response to the direction of the general or user-specific Overton windows based on an embedding space in the first machine learning model reflecting user preferences and another embedding space in the first machine learning model reflecting acceptable views of society. The first and second machine learning models may be the same or different models.

FIG. 4 shows a flow chart of a process for chat recommendation according to one or more aspects of the disclosure. Some or all of the steps of process 400 may be performed using one or more computing devices as described herein.

At step 410, a chat recommendation server (e.g., chat recommendation server 340) may receive a prompt from a user device (e.g., user device 310). A user may provide the prompt via a user interface of a chat application executed on user device 310. The user device may receive automatically generated responses from the chat recommendation server, mimicking human conversations through text or voice interactions. The chat application may be, for example, a banking chatbot that provides quick customer service answers to common requests related to bank accounts and transactional support, such as making payment. The chat application may be a social media chatbot that enables users to share thoughts on various topics, such as news, sports, entertainment, etc.

At step 420, the chat recommendation server may determine a general Overton window associated with the prompt.

In some examples, the chat recommendation server may use a first machine learning to determine the general Overton window. For example, the first machine learning model may be an LLM or a foundation model. The first machine learning model may be trained to generate a first cluster of responses for the prompt reflecting acceptable views of society. The general Overton window may correspond to the first cluster of responses in a first embedding space of the first machine learning model. An embedding may be a compact representation of a particular response to the prompt. For example, the chat recommendation server may convert the responses to the prompt into text embeddings corresponding to one or more feature vectors. The one or more feature vectors may be based on keywords in the responses. The first embedding space may be the feature vector space in which the text embeddings are placed, which may correspond to the space where the converted representations of the first cluster of responses reside. In the context of word embeddings, the feature vectors based on the keywords may be positioned in a continuous vector space. The geometric relationships between feature vectors may reflect sematic relationships of the keywords in the first cluster of responses, and keywords with similar meanings may be placed closer to each other.

In some examples, the chat recommendation server may employ statistical methods to determine the general Overton window. For example, the chat recommendation server may generate candidate responses to the prompt reflecting acceptable views of society using the LLM or foundation model. The chat recommendation server may identify a distribution of the responses and a center of the distribution. The chat recommendation server may determine a range of responses including a certain amount of standard deviation from the center of the distribution. Such range of the responses may define boundaries of the general Overton window that include the first cluster of responses representing acceptable views of society. Any responses falling below or beyond this range may be considered as left or right fringes outside the general Overton window, which may represent extreme views that are either leaning towards one direction or the other direction.

The chat recommendation server may train the first machine learning model to determine general Overton windows based on historical chat information that represent acceptable views of society. The historical chat information may include a plurality of prompt-response pairs from a plurality of users. For example, the historical chat information may include prompt-response pairs in a field of customer support for banking services. The general Overton window related to a banking chatbot may be relatively less polarized and tend to aggregate around the center. The historical chat information may include prompt-response pairs in a field of political discussions on an online forum. The responses general Overton window related to a political chatbot may be relatively more polarized and tend to span a relatively wider range. The historical chat information may include prompt-response pairs from a plurality of fields. The general Overton window related to a more universal Overton window may span even wider range of topics and responses. For example, a microphone may be placed at a bustling city center to collect various conversations from passersby and the script of the conversations may be used to train the first machine learning model to determine a more universal general Overton window reflecting the views of the general public. In another example, the chat recommendation server may use training data, such as entries on Wikipedia to train the first machine learning model (e.g., LLM) to generally understand language and determine the general Overton window. Based on the first embedding space, the first cluster of responses may generally represent acceptable views of society.

At step 430, the chat recommendation server may determine a user-specific Overton window associated with the prompt. In some examples, the chat recommendation server may use the first machine learning to determine the user-specific Overton window. The first machine learning model may be trained to generate a second cluster of responses for the prompt reflecting preferences of the user that entered the prompt. The user-specific Overton window may correspond to the second cluster of responses to the prompt in a second embedding space of the first machine learning model. For example, the chat recommendation server may convert the second cluster of responses into text embeddings having one or more feature vectors. The one or more feature vectors may be based on keywords of the second cluster of responses. The second embedding space may be the feature vector space in which the text embeddings are placed, which may correspond to the space where the converted representations of the second cluster of responses reside. Likewise, the geometric relationships between feature vectors may reflect sematic relationships between the keywords in the second cluster of responses, and keywords with similar meanings may be grouped together.

The chat recommendation server may train the first machine learning model to determine user-specific Overton windows based on historical chat information that represents preferences of the user. The historical chat information may include conversation history of prompt-response pairs from the user. For example, the user-specific historical chat information may include the user's speech, messages, emails, search terms, previously user entered prompts and responses, social media postings, chat information related to websites visited by the user, the user's browsing history, products purchased by the user, educational, professional or financial background of the user and so on. The user-specific historical information may also include a corpus of text that represents various political leanings and ideologies of the user. The chat recommendation server may train the first machine learning model that is tailored for the user to determine the user-specific Overton window based on the user-specific historical chat information.

Additionally and/or alternatively, rather than using the first machine learning model that also determines the general Overton window, the chat recommendation server may use another machine learning model, different from the first machine learning model, to determine the user-specific Overton window.

In some examples, rather than using any machine learning models, the chat recommendation server may employ statistical methods to determine the user-specific Overton window. For example, the chat recommendation server may generate responses indicating preferences of the user using the LLM or foundation model. The chat recommendation server may identify a distribution of the responses reflecting preferences of the user and a center of the distribution. The chat recommendation server may determine a range of responses including a certain number of standard deviations from the center of the distribution. Such a range of responses may define boundaries of the user-specific Overton window that include the second cluster of responses. The user-specific Overton window may or may not overlap with the general Overton window. For example, a user holding extreme left leaning views or extreme right leaning views may tend to be associated with user-specific Overton window located outside the left fringe or right fringe of the general Overton window. In this case, the user-specific Overton window might not overlap with the general Overton window.

At step 440, the chat recommendation server may generate, based on the user-specific Overton window, a plurality of candidate responses using the first machine learning model. After the first machine learning has been trained based on user-specific historical chat information, the trained first machine learning model may be used to generate a plurality of candidate response for the prompt. In an example that the user entered the prompt asking "what do you think of statement A," the chat recommendation server may use the trained first machine learning model to generate candidate responses tailored to the user. The candidate responses may include various viewpoints such as R1 "unequivocal rejection," R2 "deep reservation," R3 "strong disagreement," R4 "partial disagreement" and R5 "somewhat agreement." The candidate responses may fall within the user-specific Overton window corresponding to the second embedding space of the trained first machine learning model. Such candidate responses may be indicative of preferences of the user.

At step 450, the chat recommendation server may input the prompt and the candidate responses to a second machine learning model. The second machine learning model may include a transformer model such as Bidirectional Encoder Representations from Transformers (BERT), Generative Pre-trained Transformer (GPT), Text-to-Text Transfer Transformer (T5). The second machine learning model may also be an LLM or foundation model. The second machine learning model may take a sequence of tokens as input, and the tokens may correspond to key swords, subwords or characters extracted from the prompt and the candidate responses. The tokens may be converted to feature vectors through an imbedding layer of the second machine learning model. The second machine learning model may use positional encodings associated with positions of the tokens to add into the embeddings, indicating the sequence of words in the prompt or candidate responses.

At step 460, the chat recommendation server may receive, as output from the second machine learning model, a polarization score for each of the plurality of candidate responses. FIG. 5 shows candidate responses according to one or more aspects of the disclosure. In the example of FIG. 5, a chat recommendation server may generate candidate responses 501 to the prompt (not shown) asking "what do you think of statement A?" The candidates responses in FIG. 5 includes five responses R1-R5. The chat recommendation server may receive output from the second machine learning model indicating polarization scores corresponding to various viewpoints including R1 "unequivocal rejection" (98), R2 "deep reservation" (90), R3 "strong disagreement" (85), R4 "partial disagreement" (75) and R5 "somewhat agreement" (50).

The second machine learning model may be trained based on training data including historical prompts and responses from the user and the pre-labeled polarization scores for the responses. Additionally or alternatively, the training data may comprise articles that the user has read, social media posts from the user, etc. The training data may be stored in the unstructured format such as in .csv files. The training data may be stored in structured format or in databases such as training databases 330. The machine learning model may be an unsupervised or a supervised machine learning model. The supervised machine learning model may be trained based on user feedback verifying the polarization scores of the responses. The second machine learning model may be re-trained based on the user feedback. For example, one or more users may indicate that R2 and R3 have equal polarization in their view, and the second machine learning may be trained based on the user feedback to recalculate the polarization scores. One or more users providing the feedback may be different from the user entered the prompt. The one or more users may represent acceptable views of society.

During the model training process, the weights of each connection and/or node may be adjusted as the model adapts to generate more accurate predictions on a training set. The weights assigned to each connection and/or node may be referred to as the model parameters. For example, the chat recommendation server may use a deep learning model and the model may be initialized with a first set of model parameters. The machine learning model may use the training data as input based on the first set of model parameter and determine a polarization score for a candidate response with a first confidence level. The chat recommendation server may generate a second set of model parameters based on the adjustment on the first set of model parameters. The machine learning model may use the training data as input based on the second set of model parameter and determine the polarization with a second confidence level. Based on a comparison between the first confidence level and the second confidence level, the chat recommendation server may determine a more optimal set of parameters between the first set of model parameters and the second set of model parameters. The chat recommendation server may go through several iterations, and the second machine learning model may be tuned with a set of optimal model parameters when the confidence level reaches a predetermined threshold (e.g., 95%).

The polarization scores may indicate locations of the candidate responses within the general Overton window or the user-specific Overton window. For example, a polarization score of 50 may indicate that the corresponding candidate response is located in the center of the general Overton window. After receiving the polarizations scores on the candidate responses from the second machine learning model, the chat recommendations server may use the polarization scores to further tune the first machine learning model to generate candidate responses that are less polarized. For example, the polarization scores may be used to update the weights of the model parameters of the first machine learning model to generate candidate responses that are more aligned within the scope of the general Overton window and more consistent with the acceptable views of society.

At step 470, the chat recommendation server may select, from the plurality of candidate responses and based on the polarization score associated with each of the plurality of candidate responses, a recommended response. The chat recommendation server may determine that the general Overton window and the user-specific Overton window do not overlap with each other. The chat recommendation server may select the recommended response from the candidate responses that are located within an overlapping portion of the general Overton window and the user-specific Overton window. Additionally and/or alternatively, the chat recommendation server may determine that the general Overton window and the user-specific Overton window do not overlap with each other. The chat recommendation server may select the recommended response from the candidate responses falling within the user-specific Overton window that minimizes the distance between the user-specific Overton window and the general Overton window.

The chat recommendation server may use a distance function within the first or second machine learning model to minimize the distance between the user-specific Overton window and the general Overton window. Additionally and/or alternatively, the chat recommendation server may implement a distance function independent from the first or second machine learning models to minimize the distance between the user-specific Overton window and the general Overton window.

The general Overton window and the user-specific Overton window may shift over time. For example, a user may have a statement at time A based on the sweetness of apples "I like red delicious because it is sweet." Given that the sweetness of apples continues to increase as new varieties of apples are introduced to the market, what the general public or the specific user considers as sweet apples may change over time. The user may have a statement at time B "I don't like red delicious because it is not sweet." When the user asks a chat bot to recommend a sweet apple, the chat recommendation server may determine the shift of the sweetness of apple using the general Overton window and user-specific Overton window and make recommendations accordingly. In some examples, if the chat recommendation server observes a shift in the general Overton window and user-specific Overton window over time, a trend may be identified to predict promising future products, such as a creation of a sweeter type of apple to meet consumer demands.

Although the user-specific Overton window and the general Overton window are used as illustrating examples, the chat recommendation server may minimize a distance between any categories of responses. For example, the first category may represent a first cluster of responses indicating views from a first group of users, and the second category may represent a second cluster of responses indicating views rom a second group of users. The chat recommendation server may minimize the distance between the first and second cluster of responses, so that the recommended response based on the preferences of the first group of users would be more aligned with views of the second group of users. Likewise, the recommended response based on the preferences of the second group of users may be adjusted to be more aligned with views of the first group of users.

FIG. 5 shows a recommended response 502 according to one or more aspects of the disclosure. As illustrated in FIG. 5, the chat recommendation server generates five candidate responses (e.g., R1-R5) to the prompt (not shown) asking "what do you think of statement A?" The candidate responses R1-R5 are tailored to a specific user (e.g., the user entered the prompt) and their corresponding polarization scores are also shown-R1 "unequivocal rejection" (98), R2 "deep reservation" (90), R3 "strong disagreement" (85), R4 "partial disagreement" (75) and R5 "somewhat agreement" (50). The chat recommendation server may select the recommended response from R1 to R5 that minimizes the distance between the user-specific Overton window and the general Overton window. In some examples, the recommended response may be a response having the minimal polarization score, such as R5 (50). In other examples, the recommended response might not be the response having the minimal polarization score. For example, the chat recommendation server may determine that the user-specific Overton window associated with the user is located outside the right fringe of the general Overton window, and selecting a neutral response such as R5 (50) with the minimal polarization score as the recommended response may lose credibility with the user. Rather, the chat recommendation server may select a response that represents user's preferences while still reflecting acceptable views of society. In the example of FIG. 5, the chat recommendation server may select R4 (75)—"partial disagreement" as the recommended response to the prompt. As such, instead of merely catering to user preferences to recommend increasingly polarized responses, the chat recommendation server may provide personalized responses to the user while attempting to adjust such responses toward the direction of the general Overton window.

Figure 6:
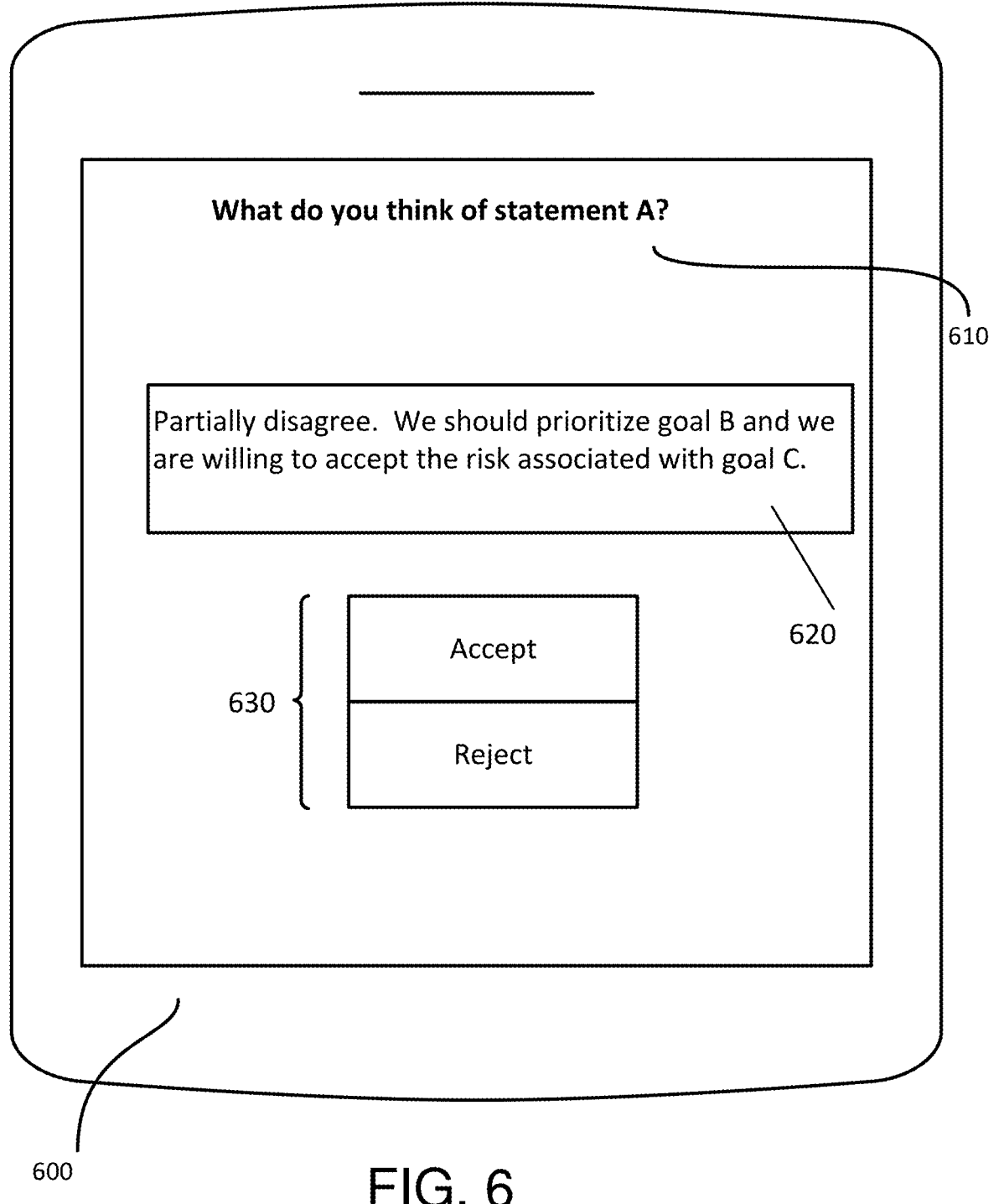
FIG. 6 shows an example interface to display the recommended response according to more aspects of the disclosure.

At step 480, the chat recommendation server may cause display of the recommended response to the prompt on the user device. FIG. 6 shows an example interface to display the recommended response according to more aspects of the disclosure. The elements in FIGS. 5 and 6 are representations of various steps in method 400 depicted in FIG. 4, such as those depicted with respect to steps 450 to 480 of the method 400. As illustrated in FIG. 6, after selecting R4 (75)—"partial disagreement" as the recommended response to the prompt, the chat recommendation server may display the recommended response on user interface 600 of the user device (e.g., user device 310).

User interface 600 displays the prompt 610 "what do you think of statement A?" User interface 600 also displays the recommended response 620 that is automatically generated by the chat recommendation server, stating "Partial disagreement. We should prioritize goal B and we are willing to accept the risk associated with goal C." The recommended response reflects both the preferences of the user and the acceptable societal views. The chat recommendation server may also provide an option 630 to the user to either accept or rejection the view reflected in the response. When the user selects one of the options, the user feedback may be sent to the chat recommendation server to further train the first and second machine learning models.

Although the chat recommendation server is illustrated to use two models—the first machine learning model and the second machine learning model in FIG. 4 to determine the recommended response and attempt to strike a balance between the user perspective and society's perspective, the chat recommendation server may use any number or combinations of machine learning models to achieve similar goals.

FIG. 7 shows a flow chart of a process for providing personalized responses to a chatbot prompt using a federated machine learning model. At step 710, a chat recommendation server (e.g., chat recommendation server 340) may receive a prompt from a user device (e.g., user device 310). At step 720, the chat recommendation server may generate a first plurality of responses using a first machine learning model. The first machine learning model may be an LLM or foundation model which is trained to generally understand language. The first plurality of responses may be associated with a general Overton window that are indicative of societal views. At step 730, the chat recommendation server may determine a polarization score for each of the first plurality of responses using a second machine learning model. The second machine learning model may be an LLM or a foundation model. The second machine learning model may also include a transformer machine learning model. At step 740, the chat recommendation model may train a federated machine learning model residing on an edge device (e.g., user device 310) that is associated with the user. The federated machine learning model may be trained to identify responses that are tailored to preferences of the user at the edge device. The chat recommendation server may collect the model parameters of the trained federated machine learning model. At step 750, the chat recommendation server may re-train the first machine learning model based on the polarization scores and the model parameters of the federated machine learning model. For example, based on the polarization scores, the chat recommendation model may adjust the model parameters of the first machine learning model to generate candidate response that are less polarized and more in line with the general Overton window reflecting acceptable views of society. Based on the model parameters collected from the trained federated machine learning model, the chat recommendation server may adjust the model parameters of the first machine learning model to generate candidate responses that are tailored to preferences of the user. The chat recommendation sever may collect and aggregate the locally updated model parameters at the edge device and at the second machine learning model, which may combine the knowledge from all participating models and devices to create an improved global model (e.g., the re-trained first machine learning model). At step 760, the chat recommendation server may generate a second plurality of responses for the prompt using the re-trained first machine learning model. The second candidate responses may be tailored to the user and also reflect acceptable views of society. At step 770, the chat recommendation server may select a recommended response that minimizes a distance between the general Overton window and the user-specific Overton window. The chat recommendation server may attempt to select a response falling within the user-specific Overton window while leaning towards the direction of the general Overton window, which renders the selected response to be more aligned with the acceptable views of society. The chat recommendation server may use a fourth machine learning model to select a response from the second plurality of responses that minimizes a distance between the general Overton window and the user-specific Overton window. Additionally and/or alternatively, the first machine learning model may include a distance function and the chat recommendation server may use this distance function to select the recommended response that minimizes a distance between the general Overton window and the user-specific Overton window. At step 780, the chat recommendation server may cause display of the recommended response on the user device.

The chat recommendation server may use one consolidated machine learning model to perform the steps in FIGS. 4 and 7. For example, the consolidated machine learning model may include various functions, such as a waiting function that serves as a filter to discard candidate responses that are too extreme or associated with relative high polarization scores. The consolidated machine learning model may include a distance function that selects the recommended response from the candidate responses to minimize a distance between the general Overton window and the user-specific Overton window. The consolidated machine learning model may include a reward function that generates candidate responses that are tailored to preferences of the user. Each user may be associated with her training weights in the consolidated model reflecting her preferences and views. The consolidated machine learning model may be an LLM or a foundation model that generally understands language and may be tuned to generate responses. The consolidated machine learning model may also include a softmax function in a final or outer layer of a deep learning model to provide polarization classification of the candidate responses. The chat recommendation server may remove the final layer (e.g., the softmax) from the consolidate machine learning, to obtain the embedding spaces representing the general Overton window and the user-specific Overton window.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:

receiving, by a computing device and from a user device associated with a user, a prompt;

training, based on historical chat information that represents one or more acceptable views of society, a first machine learning model to determine general Overton windows, wherein the historical chat information comprises a plurality of prompt response pairs from a plurality of users;

determining, based on the prompt and using the first machine learning model, a general Overton window associated with the prompt;

determining, based on the prompt and using the first machine learning model, a user-specific Overton window associated with the prompt;

generating, using the first machine learning model and based on the user-specific Overton window, a plurality of candidate responses;

inputting the prompt and the plurality of candidate responses to a second machine learning model;

receiving, as output from the second machine learning model, a polarization score for each of the plurality of candidate responses;

selecting, from the plurality of candidate responses and based on the polarization score associated with each of the plurality of candidate responses, a recommended response that minimizes a distance between the user-specific Overton window and the general Overton window; and causing, by the computing device and on the user device, display of the recommended response to the prompt.

2. The computer-implemented method of claim 1, wherein the general Overton window corresponds to a first cluster of responses in a first embedding space of the first machine learning model, wherein the first cluster of responses indicates acceptable views of society.

3. The computer-implemented method of claim 1, wherein the user-specific Overton window corresponds to a second cluster of responses in a second embedding space of the first machine learning model, wherein the second cluster of responses indicates preferences of the user.

4. The computer-implemented method of claim 1, wherein the first machine learning model comprises at least one es of a foundation model or a large language model.

5. The computer-implemented method of claim 1, wherein the second machine learning model comprises a transformer model.

6. The computer-implemented method of claim 1, wherein selecting the recommended response comprises:

determining that the general Overton window and the user-specific Overton window overlap with each other; and selecting, from the plurality of candidate responses that are located within an overlapping portion of the general Overton window and the user-specific Overton window, the recommended response.

7. The computer-implemented method of claim 1, wherein selecting the recommended response comprises:

determining that the general Overton window and the user-specific Overton window do not overlap with each other; and selecting, from the plurality of candidate responses falling within the user-specific Overton window that minimizes the distance between the user-specific Overton window and the general Overton window, the recommended response.

8. The computer-implemented method of claim 1, further comprising:

training, based on a chat history of the user, the first machine learning model to determine training user-specific Overton windows, wherein the chat history of the user comprises the plurality of prompt-response pairs from the user.

9. The computer-implemented method of claim 1, further comprising:

re-training, based on the polarization score generated by the second machine learning model, the first machine learning model.

10. A system comprising:

one or more processors; and memory storing instructions that, when executed by the one or more processors, cause the system to:

receive, from a user device associated with a user, a prompt;

train, based on historical chat information from a plurality of users representative of acceptable views of society, a first machine learning model to determine general Overton windows, wherein the historical chat information comprising a plurality of prompt-response pairs from the plurality of users;

determine, using the first machine learning model and based on the prompt, a general Overton window associated with the prompt;

determine, based on the prompt and using the first machine learning model, a user-specific Overton window associated with the prompt;

generate, using the first machine learning model and based on the user-specific Overton window, a plurality of candidate responses;

input the prompt and the plurality of candidate responses to a second machine learning model;

receive, as output from the second machine learning model, a polarization score for each of the plurality of candidate responses;

re-train, based on the polarization score generated by the second machine learning model, the first machine learning model;

select, from the plurality of candidate responses and based on the polarization score associated with each of the plurality of candidate responses, a recommended response that minimizes a distance between the user-specific Overton window and the general Overton window; and cause display of the recommended response to the prompt on the user device.

11. The system of claim 10, wherein the general Overton window corresponds to a first cluster of responses in a first embedding space of the first machine learning model, wherein the first cluster of responses indicates acceptable views of society.

12. The system of claim 10, wherein the user-specific Overton window corresponds to a second cluster of responses in a second embedding space of the first machine learning model, wherein the second cluster of responses indicates preferences of the user.

13. The system of claim 10, wherein the instructions, when executed by the one or more processors, cause the system to select the recommended response by:

determining that the general Overton window and the user-specific Overton window overlap with each other; and selecting, from the plurality of candidate responses that are located within an overlapping portion of the general Overton window and the user-specific Overton window, the recommended response.

14. The system of claim 10, wherein the instructions, when executed by the one or more processors, cause the system to select the recommended response by:

determining that the general Overton window and the user-specific Overton window do not overlap with each other; and selecting, from the plurality of candidate responses falling within the user-specific Overton window that minimizes the distance between the user-specific Overton window and the general Overton window, the recommended response.

15. The system of claim 10, wherein the first machine learning model comprises at least one of a foundation model or a large language model, and the second machine learning model comprises a transformer model.

16. One or more non-transitory computer-readable media storing instructions that, when executed by one or more processors, cause a computing device to:

receive from a user device of a user, a prompt;

train, based on historical chat information that represents one or more acceptable views of society, a first machine learning model to determine general Overton windows, wherein the historical chat information comprises a plurality of prompt-response pairs from a plurality of users;

determine, based on the prompt and using the first machine learning model, a general Overton window associated with the prompt;

determine, based on the prompt and using the first machine learning model, a user-specific Overton window associated with the prompt;

generate, using the first machine learning model and based on the user-specific Overton window, a plurality of candidate responses;

input the prompt and the plurality of candidate responses to a second machine learning model;

receive, as output from the second machine learning model, a polarization score for each of the plurality of candidate responses;

determine that the general Overton window and the user-specific Overton window do not overlap with each other;

select, based on the polarization score and from the plurality of candidate responses falling within the user-specific Overton window that minimizes a distance between the user-specific Overton window and the general Overton window, a recommended response; and cause display of the recommended response to the prompt on the user device.

17. The computer-readable media of claim 16, wherein the general Overton window corresponds to a first cluster of responses in a first embedding space of the first machine learning model, wherein the first cluster of responses indicates acceptable views of society.

18. The computer-readable media of claim 16, wherein the user-specific Overton window corresponds to a second cluster of responses in a second embedding space of the first machine learning model, wherein the second cluster of responses indicates preferences of the user.

19. The computer-readable media of claim 16, wherein the first machine learning model comprises at least one of a foundation model or a large language model, and wherein the second machine learning model comprises a transformer model.

20. The computer-readable media of claim 16, wherein the instructions, when executed by the one or more processors, cause the computing device to:

train, based on a chat history of the user, the first machine learning model to determine training user-specific Overton windows, wherein the chat history of the user comprises the plurality of prompt-response pairs from the user.

* * * * *